US010244591B2

(12) United States Patent
McDonald, II et al.

(10) Patent No.: US 10,244,591 B2
(45) Date of Patent: Mar. 26, 2019

(54) VOLTAGE/CURRENT REGULATOR SUPPLYING CONTROLLED CURRENT WITH PVT ADJUSTED HEADROOM

(71) Applicant: Texas Instruments Incorporated, Dallas, TX (US)

(72) Inventors: James J. McDonald, II, Livermore, ME (US); Ivan Duzevik, Portland, ME (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/587,177

(22) Filed: Dec. 31, 2014

(65) Prior Publication Data
US 2016/0143102 A1 May 19, 2016

Related U.S. Application Data

(60) Provisional application No. 62/080,252, filed on Nov. 14, 2014.

(51) Int. Cl.
H05B 33/08 (2006.01)
(52) U.S. Cl.
CPC ..... *H05B 33/0815* (2013.01); *H05B 33/0827* (2013.01); *H05B 33/0842* (2013.01); *Y02B 20/347* (2013.01)
(58) Field of Classification Search
USPC ........ 315/193, 194, 294, 224, 307; 209/193, 209/194, 294, 224, 307
See application file for complete search history.

(56) References Cited

U.S. PATENT DOCUMENTS

2004/0245946 A1\* 12/2004 Halter ................. H01L 25/0753
315/312
2007/0035538 A1\* 2/2007 Garcia ............... H05B 33/0851
345/212
(Continued)

OTHER PUBLICATIONS

PCT Search Report for Application No. PCT/US2015/060909, dated Feb. 18, 2016 (Feb. 18, 2016).

*Primary Examiner* — Douglas W Owens
*Assistant Examiner* — Syed M Kaiser
(74) *Attorney, Agent, or Firm* — Andrew Viger; Charles A. Brill; Frank D. Cimino

(57) ABSTRACT

A voltage/current regulator supplying controlled current with PVT headroom adjustment. In an example application, an LED backlight driver controls ILED string current, and controls a voltage regulator supplying VOUT string voltage with sufficient headroom voltage VHDRM to supply the ILED string current. The LED driver controls ILED string current with an MLED current control transistor, including gate drive referenced to a reference voltage VREF. VOUT/VHDRM are adjusted for PVT operating conditions by generating a replica/reference current ILED/RATIO (proportional to ILED string current) with a replica current control transistor MLED/RATIO based on VREF. ILED/RATIO is mirrored to a second replica MLED/RATIO transistor that saturates at a PVT_REF reference voltage corresponding to a minimum voltage that can supply the required ILED current (as represented by the ILED/RATIO replica/reference current), accounting for PVT operating conditions.

17 Claims, 3 Drawing Sheets

(56) References Cited

U.S. PATENT DOCUMENTS

| | | | |
|---|---|---|---|
| 2007/0257880 A1* | 11/2007 | Nakao | G09G 3/3406 345/102 |
| 2010/0133395 A1 | 6/2010 | Durello | |
| 2010/0194308 A1 | 8/2010 | Zhao et al. | |
| 2011/0121741 A1* | 5/2011 | Yamamoto | G09G 3/3406 315/193 |
| 2011/0169423 A1 | 7/2011 | Huang et al. | |
| 2012/0810016 | 4/2012 | Wu Xuelin et al. | |
| 2012/0206058 A1* | 8/2012 | Hirano | H05B 33/0818 315/245 |
| 2012/0262075 A1* | 10/2012 | Lynch | H05B 33/0818 315/192 |
| 2013/0082615 A1* | 4/2013 | Williams | H05B 33/0827 315/186 |
| 2014/0139143 A1* | 5/2014 | Navabi-Shirazi | H05B 33/0887 315/310 |
| 2014/0265935 A1* | 9/2014 | Sadwick | H05B 33/0815 315/307 |
| 2014/0320031 A1* | 10/2014 | Wu | H05B 33/0812 315/193 |

\* cited by examiner

VOLTAGE/CURRENT REGULATOR SUPPLYING CONTROLLED CURRENT WITH PVT ADJUSTED HEADROOM

CROSS-REFERENCE TO RELATED APPLICATIONS

Priority is claimed under USC § 119(e) to U.S. Provisional Application 62/080,252, filed 14 Nov. 2014.

BACKGROUND

Technical Field

This Patent Disclosure relates generally to resonant inductive sensors and sensing, such as can be used in sensing position, proximity or physical state or condition.

Related Art

Touch screen smart phones and tablets commonly use white-LED (WLED) backlighting power supplies. An example is an inductor-based backlighting driver, which is a type of switching power supply.

Because approximately 40% of the power used in a tablet is used in the WLED backlight driver and the LEDs, optimizing system efficiency to increase battery life is advantageous.

WLED driver losses fall into three categories: external component losses, boost losses and LED losses. The LED losses are a function of LED current and LED headroom. Significant effort has been spent to minimize headroom voltage, while still ensuring that the LED driver has sufficient headroom to supply the expected current.

BRIEF SUMMARY

This Brief Summary is provided as a general introduction to the Disclosure provided by the Detailed Description and Figures, summarizing some aspects and features of the Disclosure. It is not a complete overview of the Disclosure, and should not be interpreted as identifying key elements or features of the invention, or otherwise characterizing or delimiting the scope of the invention disclosed in this Patent Document.

The Disclosure is directed to voltage/current regulators supplying a controlled current to a load, and generally to the problem of minimizing voltage headroom supplied by the voltage/current regulator in supplying the controlled current. An example application is LED backlight illumination, including controlling string voltage to minimize string voltage headroom in supplying a controlled ILED string current. The Disclosure describes apparatus and methods suitable for supplying a controlled current based on a regulated voltage with headroom adjusted for PVT operating conditions.

According to aspects of the Disclosure, described in the context of an example application of controlling illumination of an LED backlight system that includes multiple strings of LEDs, the methodology includes controlling a power supply to regulate string voltage VOUT, and includes: (a) controlling ILED string current through a current control transistor MLED and a sense resistor RSENSE, including generating an MLED gate control signal based on comparing a reference voltage VREF to a sense voltage VSENSE from RSENSE such that ILED corresponds to VREF/RSENSE; and (b) controlling the power supply to regulate VOUT to supply the controlled ILED with a controlled headroom voltage VHDRM, including adjusting VHDRM for PVT operating conditions based on a reference voltage PVT_REF.

The methodology further includes generating the reference voltage PVT_REF by: (a) generating a reference current ILED/RATIO proportional to the ILED string current based on comparing VREF to a replica sense voltage R_VSENSE using (1) a replica current control transistor MLED/RATIO that is a replica of MLED, and (2) a replica resistor RSENSE*RATIO that is a replica of RSENSE, such that (3) the reference current ILED/RATIO is sourced by MLED/RATIO through RSENSE*RATIO generating R_VSENSE; and then (b) generating the reference voltage PVT_REF by (1) mirroring ILED/RATIO through a PVT_MLED/RATIO transistor that is a replica of MLED, and a PVT_RSENSE*RATIO resistor that is a replica of RSENSE, and (2) generating PVT_REF based on the saturation voltage of PVT_MLED/RATIO, corresponding to a VOUT string voltage that can supply the ILED string current, accounting for PVT operating conditions.

Other aspects and features of the invention claimed in this Patent Document will be apparent to those skilled in the art from the following Disclosure.

DESCRIPTION

Figure 1:
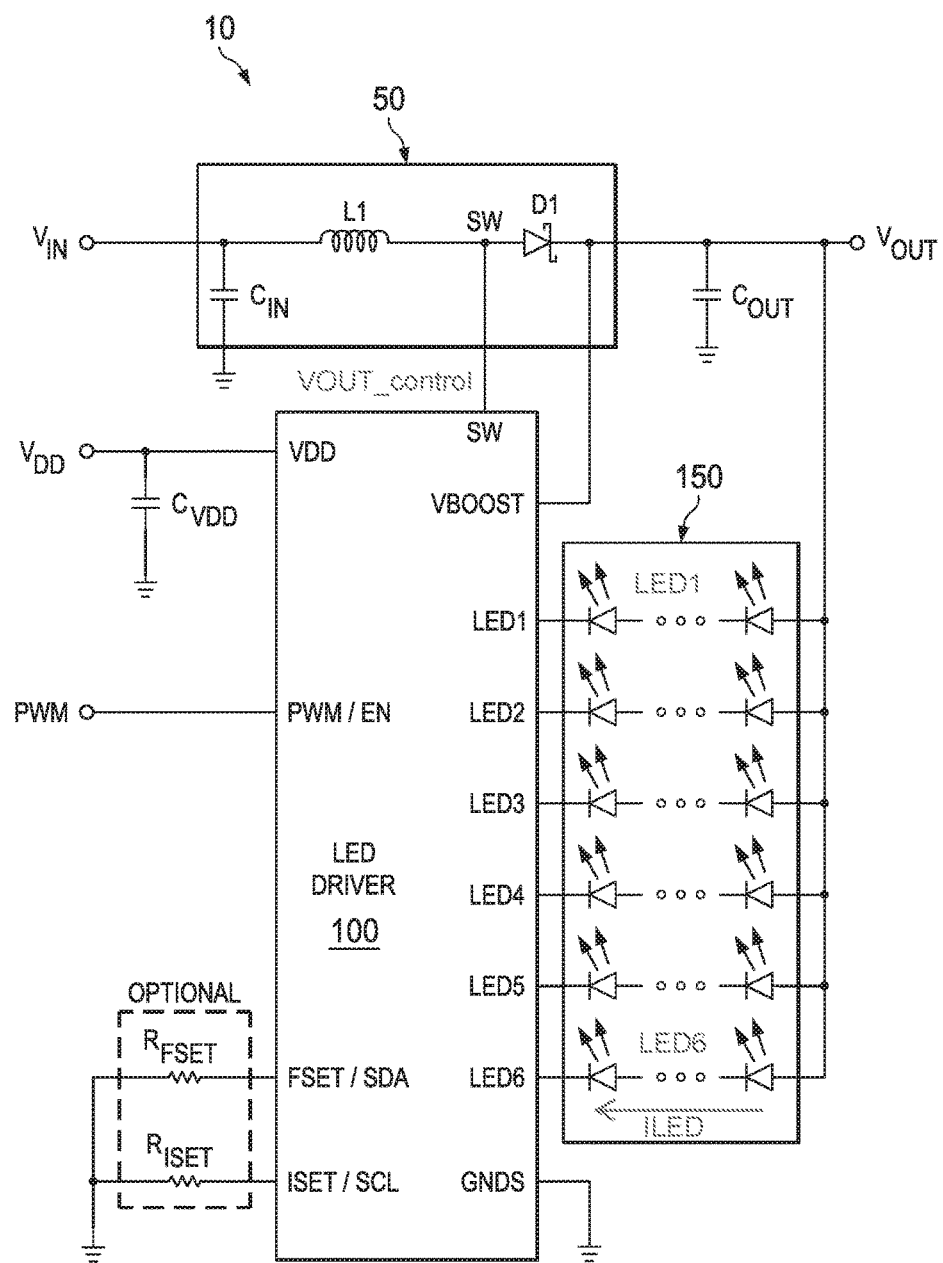
FIG. 1 illustrates an example embodiment of an LED backlight system for controlling illumination from multiple LED strings, including an LED driver and a boost power supply, the LED driver controlling ILED string current and VOUT string voltage, including dynamically adjusting string voltage headroom for PVT operating conditions.

This Description and the Figures constitute a Disclosure of example embodiments and system applications that illustrate various features and advantages of a voltage/current regulator supplying controlled current with PVT adjusted headroom. Headroom is dynamically adjusted for PVT operating conditions.

Example embodiments are implemented as an LED driver circuit suitable for us in an LED backlight system, controlling ILED current through multiple LED strings, including controlling string voltage VOUT to supply ILED with voltage headroom VHDRM.

In brief overview, for the example application, an LED backlight driver controls ILED string current, and controls a power supply (boost regulator) to regulate VOUT string voltage to supply the ILED string current with sufficient headroom voltage VHDRM, adjusted for PVT operating conditions. The LED driver includes PVT headroom circuitry that generates a replica/reference current ILED/RATIO (proportional to ILED string current), which is mirrored to a replica MLED/RATIO transistor (replicating the MLED current control transistor used to control ILED) that saturates at a PVT_REF reference voltage corresponding to a minimum voltage that can supply the required ILED current, accounting for PVT operating conditions.

In example embodiments, an LED driver controls ILED current through an LED string, including controlling a power supply to regulate string voltage VOUT. The LED driver includes: (a) ILED control circuitry configured to control ILED string current; and (b) PVT headroom circuitry configured to generate reference voltage PVT_REF used to adjust VHDRM for PVT operating conditions. VOUT control circuitry is configured to provide a VOUT_control signal to the power supply (such as a switching signal to a switching node) to regulate VOUT to supply the controlled ILED with a controlled headroom voltage VHDRM, including adjusting VHDRM for PVT operating conditions.

In example embodiments, the ILED control circuitry is configured to control ILED string current, and can include: (a) a current control transistor MLED that controls ILED based on an MLED gate control signal; (b) a sense resistor RSENSE that generates a sense voltage VSENSE based on ILED through the current control transistor; and (c) an MLED gate control amplifier that compares a reference voltage VREF to VSENSE, and generates the MLED gate control signal such that ILED corresponds to VREF/RSENSE.

In example embodiments, the PVT headroom circuitry is configured to generate the reference voltage PVT_REF, and can include: (a) an ILED reference circuit that generates an ILED reference current ILED/RATIO; and (b) a PVT reference circuit configured to generate reference voltage PVT_REF. The ILED reference circuit can include: (1) a replica current control transistor MLED/RATIO that is a replica of MLED, (2) a replica resistor RSENSE*RATIO that is a replica of RSENSE, and (3) a replica gate control amplifier configured to generate a replica gate control signal by comparing VREF to a replica sense voltage R_VSENSE from RSENSE*RATIO, and (4) in response to the replica gate control signal, the replica MLED/RATIO sources a reference current ILED/RATIO proportional to the ILED string current through RSENSE*RATIO generating R_VSENSE. The PVT reference circuit can include: (1) a PVT_MLED/RATIO transistor that is a replica of MLED; (2) a PVT_RSENSE*RATIO resistor that is a replica of RSENSE; and (3) a current mirror that mirrors the ILED/RATIO current through PVT_MLED/RATIO and PVT_RSENSE*RATIO, The PVT reference circuit is configured such that PVT_MLED/RATIO saturates at the reference voltage PVT_REF corresponding to a VOUT string voltage that can supply the ILED string current, accounting for PVT operating conditions.

FIG. 1 illustrates an example embodiment of an LED backlight system 10 that includes a boost power supply 50 and an LED backlight driver 100. LED driver 100 provides ILED control circuitry that controls ILED string current through LED strings 150, including providing boost control for string voltage VOUT.

As described in connection with FIG. 3, the example LED backlight driver 100 incorporates headroom control to dynamically adjust string voltage headroom for PVT operating conditions.

LED backlight system 10 is illustrated with six LED driver channels (LED pins) for six LED strings LED1-LED6. For example, each LED string can have eight LEDs, each with a forward voltage of approximately 3V, resulting in a VOUT string voltage of around 25V.

Backlight system 10 uses a boost converter 50 to provide LED string voltage VOUT. As illustrated, boost converter 50 includes an external boost inductor L1 and flyback diode D1. Boost converter 50 is coupled to the LED string load 150 through an output filter capacitor Cout.

LED driver 100 incorporates a boost controller that controls the power transfer switch node SW in boost converter 50, providing a VOUT control signal (from a VOUT control terminal SW). LED driver 100 controls boost VOUT to ensure that the LED drivers (ILED string driver circuits) have sufficient headroom to supply the required ILED string current. A boost controller includes boost headroom control that monitors/senses LED string headroom voltage VHDRM on each of the LED channel pins LED1-LED6. The boost controller controls VOUT to maintain the required VHDRM above an internal reference.

Figure 2:
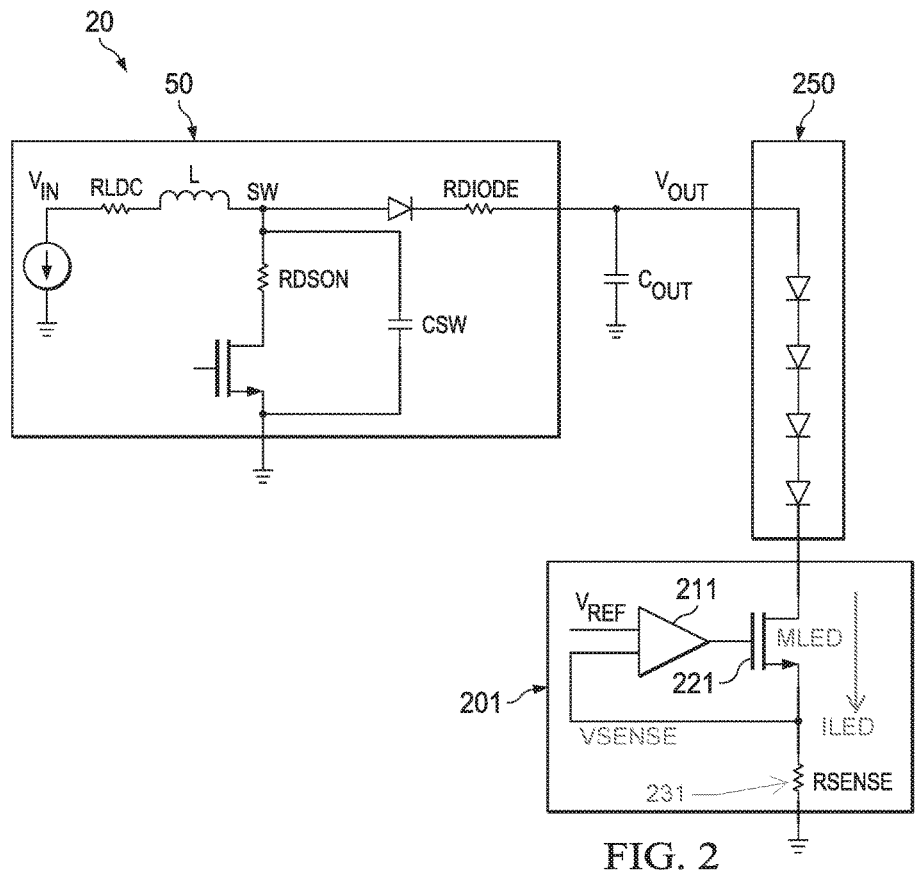
FIG. 2 functionally illustrates an LED backlight system including an LED driver represented by an LED string and ILED string driver that includes an NMOS current control transistor (MLED) that controls ILED string current (gate drive amplifier based on a reference voltage VREF), with the LED driver providing boost control for regulated string voltage VOUT, including headroom voltage VHDRM.

FIG. 2 illustrates elements of the example LED backlight system 10, with the LED backlight system represented by LED string 251. For each LED string, including LED string 251, the LED Driver (FIG. 1, 100) includes an ILED string driver 201. ILED string driver 201 is coupled to the bottom of LED string 251, at an associated LED channel pin.

ILED string driver 201 includes a gate drive amplifier 211 controlling a current control transistor (MLED) 221 (NMOS), and a sense resistor Rsense 231. Boost converter 50 is controlled to supply string voltage VOUT sufficient to supply a controlled string current ILED through LED string 251 with sufficient headroom voltage VHDRM at the LED channel pin.

Gate drive amplifier 211 and MLED 221 are configured as a source follower, regulating ILED string current through MLED 221 by comparing the voltage Vsense at the top of Rsense to a reference voltage VREF. ILED through the LEDs is therefore VREF/Rsense.

As the voltage on Rsense increases, ILED becomes easier to regulate accurately, but requires a higher headroom voltage on the LED string/channel pin (VHDRM) to ensure correct ILED string current. A typical ILED string current range is 0.1 mA-25 mA.

Referring also to FIG. 1, the boost controller in LED driver 100 (FIG. 1) monitors the VHDRM voltage at the LED string/channel pins, and regulates the boost voltage VOUT to keep LED pin voltage above VREF (based on gate control amplifier comparing VREF to Vsense). The reference voltage VREF can be selected to ensure proper headroom requirements over operating process, voltage and temperature (PVT), for the required ILED string current (for example, 800 mV).

Headroom control can be used to adjust VHDRM (by regulating VOUT) based on ILED string current requirements. For example, maximum headroom (for example, 800 mV) can be specified for a maximum ILED current based on slow process, low voltage and high temperature, and then headroom can be adjusted lower for lower ILED operating currents. A maximum headroom approach enables backlight driver 100 to operate over specified temperature and voltage ranges, as well as over process variations, so that LED string headroom is set higher to account for these variations. However, under "nominal" PVT conditions, the required headroom can be significantly less than a maximum, worst case design constraint (for example, <300 mV).

Figure 3:
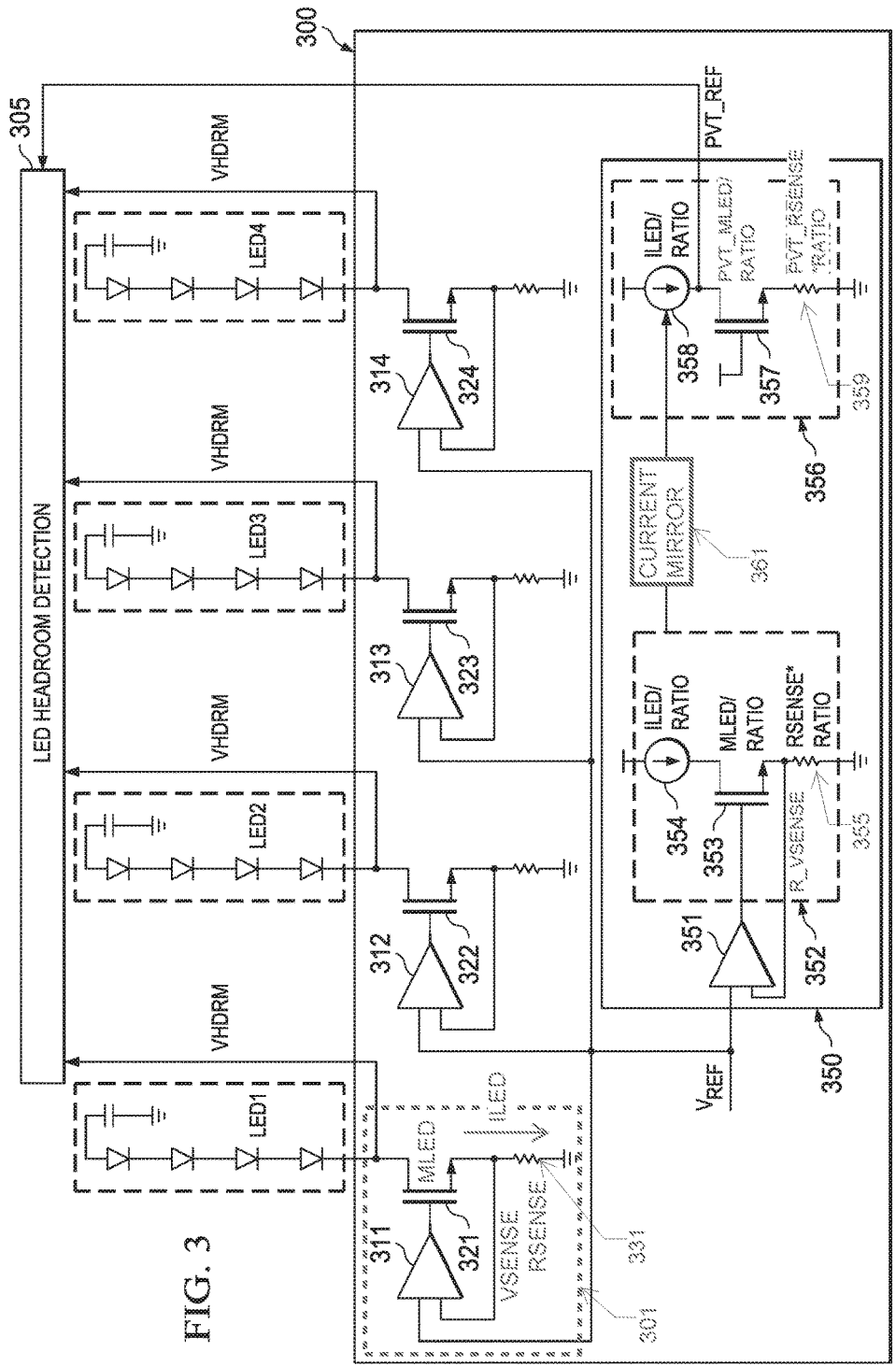
FIG. 3 illustrates an example embodiment of an LED driver that controls ILED string current, and incorporates PVT head room control for dynamically adjusting string voltage headroom for PVT operating conditions, based on generating a reference/replica string current ILED/RATIO with a replica MLED/RATIO transistor (replicating the ILED current control transistor MLED), which is mirrored through a second replica MLED/RATIO transistor that saturates at a reference voltage PVT_REF corresponding to a minimum voltage that can supply the required ILED string current (as represented by the reference current ILED/RATIO), accounting for PVT operating conditions.

FIG. 3 illustrates an example embodiment of an LED driver 300 that controls ILED string current through LED strings LED1-LED4, and incorporates PVT head room circuitry 350 used to dynamically adjust string voltage headroom (bottom of the LED string) for PVT operating conditions.

For each of the LED1-LEDD4 strings, an ILED string driver controls ILED string current. The ILED string drivers include respective gate control amplifiers 311-314 and string current control transistors (MLED) 321-323 (NMOS), together with associated sense resistors, and function to control ILED string current as described in connection with FIG. 2 (based on a reference voltage VREF). For example, for LED string LED1, an ILED string driver (ILED control circuitry) 301 includes a current control transistor MLED 321 and associated MLED gate driver/control amplifier 311, that regulates ILED string current through MLED 321 by comparing the voltage VSENSE at the top of a sense resistor RSENSE 331, to a reference voltage VREF. ILED through the LED1 string is therefore VREF/RSENSE.

PVT headroom circuitry 350 in effect replicates the ILED string drivers, including generating a reference current ILED/RATIO (based on VREF), and outputs a PVT_REF voltage (based on the ILED/RATIO) used by the boost controller in regulating VOUT to adjust string voltage headroom VHDRM to account for PVT operating conditions.

PVT headroom circuitry 350 includes a replica gate control amplifier 351 that replicates the gate control amplifiers 311-314, and is referenced to the VREF reference voltage. PVT headroom circuitry 350 includes an ILED reference circuit 352 that generates a reference/replica current ILED/RATIO proportional to the string ILED current (based on VREF) by a RATIO parameter, and a PVT reference circuit 356 that generates, based on ILED/RATIO, a PVT_REF reference voltage that tracks PVT.

That is, the reference voltage PVT_REF tracks variations in process, voltage and temperature, as well as ILED variation. PVT reference circuit 356 measures the minimum headroom voltage required to ensure accurate ILED current regulation based on PVT operating conditions.

ILED reference circuit 352 includes a replica current control transistor (MLED/RATIO) 353 that replicates the current control MLEDs 321-324, and a replica sense resistor RSENSE*RATIO 355. Replica gate control amplifier 351 provides gate control to MLED/RATIO 353 based on a comparison of VREF and a sense voltage R_VSENSE from RSENSE*RATIO 355, sourcing the reference/replica current ILED/RATIO, represented by current source 354. The reference/replica current ILED/RATIO is mirrored to PVT reference circuit 356 by mirror circuit 361.

PVT reference voltage circuit 356 includes a replica current control transistor PVT MLED/RATIO 357 that replicates the current control MLEDs 321-324, and a replica sense resistor PVT RSENSE*RATIO 359. The reference current ILED/RATIO from replica ILED circuit 352 is mirrored by current mirror 361 to PVT reference circuit 356, as represented by current source 358. The mirrored ILED/RATIO reference/replica current is sourced through replica MLED/RATIO 357 and RSENSE*RATIO 359, and generates the reference voltage PVT_REF.

PVT MLED/RATIO 357 and PVT RSENSE*RATIO 359 are designed such that PVT MLED/RATIO 357 saturates at a minimum voltage (PVT_REF) that can supply the required ILED current (as represented by the reference/replica current ILED/RATIO), accounting for PVT operating conditions. That is, the PVT_REF (saturation) voltage generated by PVT reference voltage circuit 356 tracks PVT.

The PVT_REF reference voltage from the PVT reference circuit 356 (PVT headroom circuit 350), corresponding to the saturation voltage for PVT MLED/RATIO 357, is provided to headroom detection circuitry 305. Headroom detection circuitry 305 receives the VHDRM headroom voltages from the LED strings LED1-LED4, supplying headroom information to the boost controller (FIG. 1, LED driver 100). Based on the PVT_REF reference voltage from PVT headroom circuit 350, the boost converter (FIG. 1, 50) regulates VOUT to supply the required VHDRM, adjusted for PVT operating conditions. That is, VHDRM is adjusted in response to PVT_REF to track PVT, but remaining high enough for the required ILED string current.

Figure 4:
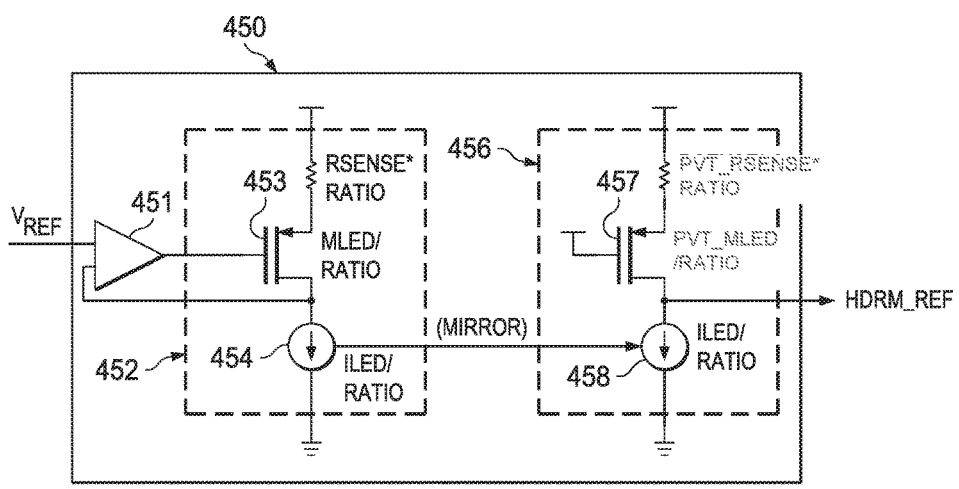
FIG. 4 illustrates an example alternate embodiment of a PVT headroom circuit configured with PMOS replica transistors.

FIG. 4 illustrates an example embodiment of a PVT headroom circuit 450 configured with PMOS replica transistors. PVT headroom circuit 450 includes ILED reference circuit 452 with PMOS MLED/RATIO 453, and PVT reference circuit 456 with PMOS PVT MLED/RATIO 457. As with the NMOS embodiment in FIG. 3, PVT headroom circuit outputs a PVT_REF reference voltage that corresponds to the saturation voltage for PVT MLED/RATIO 457, based on the reference current ILED/RATIO 454 generated with PMOS MLED/RATIO 453 and mirrored to the PVT reference circuit 456 as represented by current source ILED/RATIO 458.

Advantages of the LED driver with PVT adjusted LED string headroom voltage (adjusted for PVT operating conditions), include improved system efficiency and lower power losses, resulting for example in longer battery life. Headroom control is adapted for process, supply voltage and temperature. Accounting for PVT variation can result in additional headroom adjustment in the range of 500 mV, which can result in system savings in the range of 2% (a reduction in losses in the range of 16-20+%). Additional embodiments/applications for voltage/current regulation with PVT_adjusted headroom control include battery charging.

The Disclosure provided by this Description and the Figures sets forth example embodiments and applications illustrating aspects and features of the invention, and does not limit the scope of the invention, which is defined by the claims. Known circuits, functions and operations are not described in detail to avoid obscuring the principles and features of the invention. These example embodiments and applications can be used by ordinarily skilled artisans as a basis for modifications, substitutions and alternatives to construct other embodiments, including adaptations for other applications.

The invention claimed is:

1. A circuit for use in a system including at least one LED string and a power supply to supply an LED string current (ILED) through the at least one LED string at a regulated string voltage (VOUT) corresponding to a pre-defined headroom voltage (VHDRM) for the at least one LED string, comprising: a current control circuitry coupled to the at least one LED string including a current control transistor (MLED) to control ILED based on a gate control signal; a sense resistor (RSENSE) coupled to the current control transistor to generate a sense voltage (VSENSE) based on ILED and a gate control amplifier to compare a reference voltage (VREF) to VSENSE, and to generate the gate control signal such that ILED corresponds to VREF/RSENSE; a voltage control circuitry to provide a VOUT_control signal at a VOUT_control terminal corresponding to VHDRM, and based at least in part on a second reference voltage (PVT_REF); and a headroom circuitry to generate the second reference voltage, including a current reference circuit including a current source; a replica current control transistor (MLED/RATIO) that is a replica of MLED, coupled to the current source; a replica resistor (RSENSE*RATIO) that is a replica of the sense resistor, coupled to the replica current control transistor; a replica gate control amplifier to generate a replica gate control signal by comparing VREF to a replica sense voltage (R_VSENSE) from RSENSE*RATIO; and the replica current control transistor responsive to the replica gate control signal to source a reference current (ILED/RATIO) from the current source proportional to the LED string current through the replica resistor generating R_VSENSE; and a reference circuit to generate a second reference voltage (PVT_REF), including a current mirror that mirrors the reference current; a second transistor (PVT_MLED/RATIO) that is a replica of the current control transistor, coupled to the current mirror; a second resistor (PVT_RSENSE*RATIO) that is a replica of the sense resistor, coupled to the second transistor; and the second transistor to saturate at the second reference voltage (PVT_REF).

2. The circuit of claim 1, wherein the current control transistor (MLED) is a low side NMOS source follower, with a source connected to the sense resistor (at the VSENSE node) and to the gate control amplifier.

3. The circuit of claim 2, wherein the MLED/RATIO and the PVT_MLED/RATIO transistors are NMOS transistors.

4. The circuit of claim 1, wherein the power supply comprises a boost converter, and the voltage control circuitry comprises a boost controller.

5. The circuit of claim 1, wherein a LED Driver is used in an LED backlight system with multiple strings of LEDs, and the LED Driver includes an LED driver channel for each LED string, and includes for each LED driver channel respective current control circuitry and headroom circuitry.

6. The circuit of claim 5, wherein the LED Driver is an integrated circuit with multiple LED driver channels/pins, each connectable to a respective LED string, and further comprising multiple current control circuits, each to control respective string current for a respective LED string connected to a respective LED driver channel/pin; and further comprising, for each current control circuit, a headroom circuit to generate a respective reference voltage (PVT_REF); the voltage control circuitry to provide VOUT_control to the power supply to regulate VOUT for the multiple LED strings, including adjusting VHDRM for PVT operating conditions based on the multiple reference voltages (PVT_REF) from respective headroom circuits.

7. A system for LED backlight illumination, comprising: multiple LED strings; a power supply configured to supply to each LED string an LED string current (ILED) at a regulated string voltage VOUT corresponding to a pre-defined headroom voltage (VHDRM); an LED driver including an LED channel/pin connected to a respective LED string, and including for each LED string: a current control circuitry coupled to LED string to control, including a current control transistor (MLED) coupled to the LED string to control ILED based on a gate control signal; a sense resistor (RSENSE) coupled to the current control transistor to generate a sense voltage (VSENSE) based on ILED; and a gate control amplifier to compare a reference voltage VREF to VSENSE, and to generate the gate control signal such that ILED corresponds to VREF/RSENSE; a voltage control circuitry to provide VOUT_control to the power supply to regulate VOUT to supply the controlled ILED with the pre-defined headroom voltage (VHDRM), including to adjust VHDRM for PVT operating conditions based on a second reference voltage (PVT_REF); and a headroom circuitry to generate the second reference voltage (PVT_REF), including an current reference circuit, including a current source; a replica current control transistor (MLED/RATIO) that is a replica of the current control transistor, coupled to the current source; a replica resistor (RSENSE*RATIO) that is a replica of the sense resistor, coupled to the replica current control transistor; and a replica gate control amplifier to generate a replica gate control signal by comparing VREF to a replica sense voltage (R_VSENSE) from the replica resistor; and the replica current control transistor responsive to the replica gate control signal to source a reference current (ILED/RATIO) from the current source proportional to the LED string current through the replica resistor generating the R_VSENSE; and a reference circuit to generate a second reference voltage (PVT_REF), including a current mirror that mirrors the reference current; a second transistor (PVT_MLED/RATIO) that is a replica of the current control transistor, coupled to the current mirror; a second resistor (PVT_RSENSE*RATIO) that is a replica of the sense resistor, coupled to the second transistor; and the second transistor to saturate at the second reference voltage (PVT_REF).

8. The circuit of claim 7, wherein the current control transistor (MLED) is a low side NMOS source follower, with a source connected to the sense resistor (at the VSENSE node) and to the gate control amplifier.

9. The system of claim 8, wherein the MLED/RATIO and the PVT_MLED/RATIO transistors are NMOS transistors.

10. The system of claim 7, wherein the power supply comprises a boost converter, and the voltage control circuitry comprises a boost controller.

11. The system of claim 7, wherein the LED Driver is an integrated circuit with multiple LED driver channels/pins, each connectable to a respective LED string, and: further comprising multiple current control circuits, each to control respective string current (ILED) for a respective LED string connected to a respective LED driver channel/pin; and further comprising, for each current control circuit, a headroom circuit to generate a respective reference voltage (PVT_REF); the voltage control circuitry to provide VOUT_control to the power supply to regulate VOUT for the multiple LED strings, including adjusting VHDRM for PVT operating conditions based on the multiple reference voltages (PVT_REF) from respective headroom circuits.

12. A method adaptable for controlling illumination of an LED backlight system that includes multiple LED strings, including controlling a power supply to supply an LED string current (ILED) through each LED string at a regulated string voltage VOUT corresponding to a pre-defined headroom voltage (VHDRM) for the multiple LED strings, comprising: controlling the LED string current through a current control transistor (MLED) and a sense resistor (RSENSE), including generating a gate control signal based on comparing a reference voltage (VREF) to a sense voltage (VSENSE) from the sense resistor such that ILED corresponds to VREF/RSENSE; controlling the power supply to regulate VOUT to supply ILED to each respective LED string with a controlled headroom voltage (VHDRM), including adjusting VHDRM for PVT operating conditions based on a second reference voltage (PVT_REF); and generating the second reference voltage (PVT_REF), including generating a reference current (ILED/RATIO) proportional to the LED string current based on comparing VREF to a replica sense voltage (R_VSENSE) using: a replica current control transistor (MLED/RATIO) that is a replica of the current control transistor, and a replica resistor (RSENSE*RATIO) that is a replica of the sense resistor; the reference current sourced by the replica current control transistor through the replica resistor generating RVSENSE; and generating the reference voltage (PVT_REF), including mirroring the reference current through a second transistor (PVT_MLED/RATIO) that is a replica of the current control transistor, and a second resistor (PVT_RSENSE*RATIO) that is a replica of the sense resistor; and generating PVT_REF based on the saturation voltage of the second transistor.

13. The method of claim 12, wherein the current control transistor is a low side NMOS source follower, with a source connected to the sense resistor.

14. The method of claim 13, wherein the MLED/RATIO and the PVT_MLED/RATIO transistors are NMOS transistors.

15. The method of claim 12, wherein the power supply comprises a boost converter, and the voltage control circuitry comprises a boost controller.

16. The method of claim 12, performed by an LED Driver integrated circuit configured with multiple LED driver channels/pins, each to connect to a respective LED string, and with multiple respective current drivers, each to control LED string current (ILED) through a respective current control transistor (MLED), and to generate the second reference voltage (PVT_REF), including: generating a respective reference current (ILED/RATIO) proportional to the LED string current based on VREF using a respective replica (MLED/RATIO) transistor that is a replica of the respective current control transistor; generating the respective voltage (PVT_REF) by mirroring the reference current through a the second transistor that is a replica of the respective current control transistor, and generating PVT_REF based on the saturation voltage of the second transistor.

17. The circuit of claim 1, wherein the voltage control circuitry adjusts the VOUT control signal based on PVT_REF to adjust VHDRM for PVT operating conditions.

* * * * *